Figure 1:
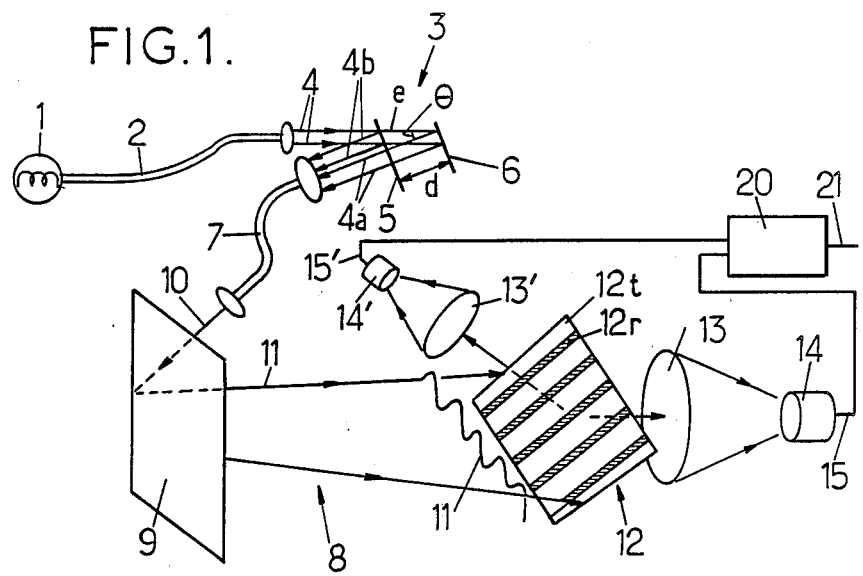

United States Patent [19]

Graindorge et al.

[11] Patent Number: 4,932,782
[45] Date of Patent: Jun. 12, 1990

[54] CHANNELLED LIGHT SPECTRUM ANALYSIS MEASUREMENT METHOD AND DEVICE, MORE ESPECIALLY FOR MEASURING A LOW AMPLITUDE MOVEMENT OF A MOBILE SURFACE, WHICH MAY BE REPRESENTATIVE OF A VARIATION OF A PHYSICAL MAGNITUDE CONVERTIBLE INTO SUCH A MOVEMENT

[75] Inventors: Philippe Graindorge, Crimolois; Francois X. Desforges, Fontenay Le Fleury, both of France

[73] Assignee: Photonetics S.A., Marly le Roi, France

[21] Appl. No.: 224,976

[22] Filed: Jul. 27, 1988

[30] Foreign Application Priority Data

Jul. 31, 1987 [FR] France ................................. 8710929

[51] Int. Cl.⁵ .............................................. G01B 9/02
[52] U.S. Cl. ..................................... 356/358; 356/356
[58] Field of Search ............... 356/346, 349, 352, 356, 356/358

[56] References Cited

U.S. PATENT DOCUMENTS 3,549,260 12/1970 Barringer ............................ 356/346
3,563,663 2/1971 Barringer ............................ 356/346
4,472,054 9/1984 Pouit ................................... 356/352

*Primary Examiner*—Vincent P. McGraw
*Assistant Examiner*—S. A. Turner
*Attorney, Agent, or Firm*—Helfgott & Karas

[57] ABSTRACT

A measuring method and device are provided based on the analysis of a channelled light spectrum, particularly for measuring a low amplitude movement of a mobile surface, possibly representative of the variation of a physical magnitude convertible into such a movement. Said device comprises a two beam interferometer (3) with two reflecting surfaces, one (5) fixed and the other (6) mobile, defining a difference of the rate of progress (e) of the light rays in the interferometer, a light source (1) and an analyzer (8) for analyzing the channelled spectrum generated by said light source in said interferometer, the analyzer is formed by means (9) for spactially spreading the channelled spectrum, by means of a filter (12) whose transmission and/or reflection coefficient is periodic, at least in one direction, of fixed period equal or substantially equal, except possibly for a factor, to the period of the spatial distribution of the spatially spread spectrum; and at least one photodetector (14,14') receiving the light transmitted and/or reflected by said network for determining said difference of rate of progress.

13 Claims, 4 Drawing Sheets

U.S. Patent    Jun. 12, 1990    Sheet 1 of 4    4,932,782

CHANNELLED LIGHT SPECTRUM ANALYSIS MEASUREMENT METHOD AND DEVICE, MORE ESPECIALLY FOR MEASURING A LOW AMPLITUDE MOVEMENT OF A MOBILE SURFACE, WHICH MAY BE REPRESENTATIVE OF A VARIATION OF A PHYSICAL MAGNITUDE CONVERTIBLE INTO SUCH A MOVEMENT

The present invention relates to the analysis of channelled light spectra, namely spectra resulting from the modulation of light of relatively extended spectral width, in particular white light, using a periodic or at least a substantially periodic waveform, using an amplitude division interferometer, also called double wave or double beam interferometer, such as a Fizeau or Michelson interferometer.

A Fizeau interferometer, for example, comprises two reflecting surfaces producing an interference system, namely a fixed surface and a mobile surface and when it is illuminated with white light or with light of extended spectral width, a channelled spectrum results representative of the variable distance between the two surfaces, so of the position of the mobile surface, whence the possibility of measuring the movement of the latter by analyzing the channelled spectrum produced by the interferometer.

Other physical magnitudes may further be converted into the movement of a mobile surface, such as a pressure (the conversion being made by means of a deformable resilient membrane one face of which is subjected to the pressure to be measured), a temperature (by determining the expansion that it causes), a force (by determining the end of a spring subjected to this force), an electric field (acting on a piezoelectric element which is deformed) or a magnetic field (acting on a magnetostrictive element).

The analysis of a channelled spectrum provides then the possibility of measuring a movement or more generally a physical magnitude convertible into movement, It may also make it possible to measure a wavelength when the interferometer is illuminated with monochromatic light (whose wavelength it is desired to measure) or a refraction index when the gap between the fixed surface and the mobile surface is filled with a substance (whose index it is desired to measure) since the channelled spectrum depends on the wavelength and the index.

It has already been proposed to analyze such a channelled spectrum using a second interferometer identical to the first interferometer producing the channelled spectrum and taking advantage of the fact that the light intensity at the output of the second interferometer is maximum when the difference in rate of progress of the light ray therein is identical to the difference in the rate of progress of the light rays in the first interferometer.

Thus, in a communication from Messrs Thomas BOSSELMAN, Rheinhardt ULRICH and Hervé ARDITI published in the Actes de la conférence sur les capteurs à fibres optiques entitled "OPTO 85" (21-23 May, 1985 in Paris), two Michelson interferometers were used connected together by multimode optical fibers by reconstructing in the second interferometer, by means of a mobile reflecting surface, the position of the mobile reflecting surface (whose movement it is desired to determine) of the first interferometer illuminated with white light, the position of the mobile surface of the second interferometer being detected by means of a photodiode which receives the light intensity from the second interferometer.

Such a double interferometer device requires, on the one hand, the use of two interferometers which are absolutely identical and, on the other hand, very accurate control so as to obtain identity of the difference in rate of progress of the light rays in the two interferometers, using in particular a special transitory frequency synchronized for the interference fringes and a microprocessor, as well a helium-neon laser stabilized so as to establish a reference frequency.

An object of the present invention is then to improve the analysis of the channelled spectrum produced by an interferometer, by simplifying the latter, in particular by not using a second interferometer For this, the channelled spectrum produced by a double beam interferometer, such as a Fizeau interferometer, is analyzed by spreading the frequency modulated channelled spectrum spatially, filtering the spatially spread spectrum with a filtering coefficient which varies periodically with a fixed period, which is equal or substantially equal, except possibly for a constant factor, to the spatial period of the spatially spread spectrum, for a reference position of the mobile surface of the interferometer.

The present invention has then as object:

on the one hand, a channelled spectrum light spectrum analysis measurement method, particularly for measuring a low amplitude movement of a mobile surface, possibly representative of the variation of a physical magnitude convertible into such a movement, consisting in generating a channelled spectrum whose spectral modulation frequency is a function of a mobile surface with respect to a reference position thereof and analyzing the channelled spectrum, characterized in that the channelled spectrum is analyzed by spreading the frequency modulated channelled spectrum spatially, filtering the spatially spread spectrum with a filtering coefficient which varies periodically with a fixed period, which is equal or substantially equal, except possibly for a constant factor, to the spatial period of the spatially spread spectrum, for a reference position of said mobile surface and deriving from this filtered spectrum the modulation phase and possibly the mean intensity of the channelled spectrum;

on the other hand, a measuring device implementing this method which comprises a double beam interferometer with two reflecting surfaces, one surface of which is fixed and the other is mobile, the variable gap between these two surfaces defining the difference in the rate of progress of the light rays in the interferometer, a light source illuminating said interferometer and an analyzer for analyzing the channelled spectrum generated by said light source in said interferometer, characterized in that the analyzer is formed by means for spatially spreading the frequency modulated channelled spectrum by means of a filter whose transmission and-/or reflection coefficient is periodic, at least in one direction, of a fixed period equal or substantially equal, except possibly for a factor, to the period of the spatial distribution of the spatially spread spectrum, and at least one photodetector receiving the light transmitted and-/or reflected by said network for determining the modulation phase of the channelled spectrum and so said difference in rate of progress which depends on the movement of said mobile surface.

Advantageously:

two photodetectors are provided measuring the transmitted and/or reflected light and the outputs of the two photodetectors are processed so as to determine not only the phase but also the mean intensity of the channelled spectrum;

the interferometer is a Fizeau interferometer;

the spatial spreading means are formed by a diffraction network;

the light source is a white light source, such as a tungsten filament lamp, or a light emitting diode (LED);

optical fibers are provided, preferably multimode optical fibers, between the light source and the input of the interferometer, on the one hand, and the output of the interferometer and the analyzer, on the other, which makes it possible to measure small amplitude movements even in positions which are difficult of access without fearing electromagnetic disturbances.

The invention may in any case be well understood from the complement of description which follows and the accompanying drawings, which complement and drawings are of course given solely by way of indication.

Figure 2:
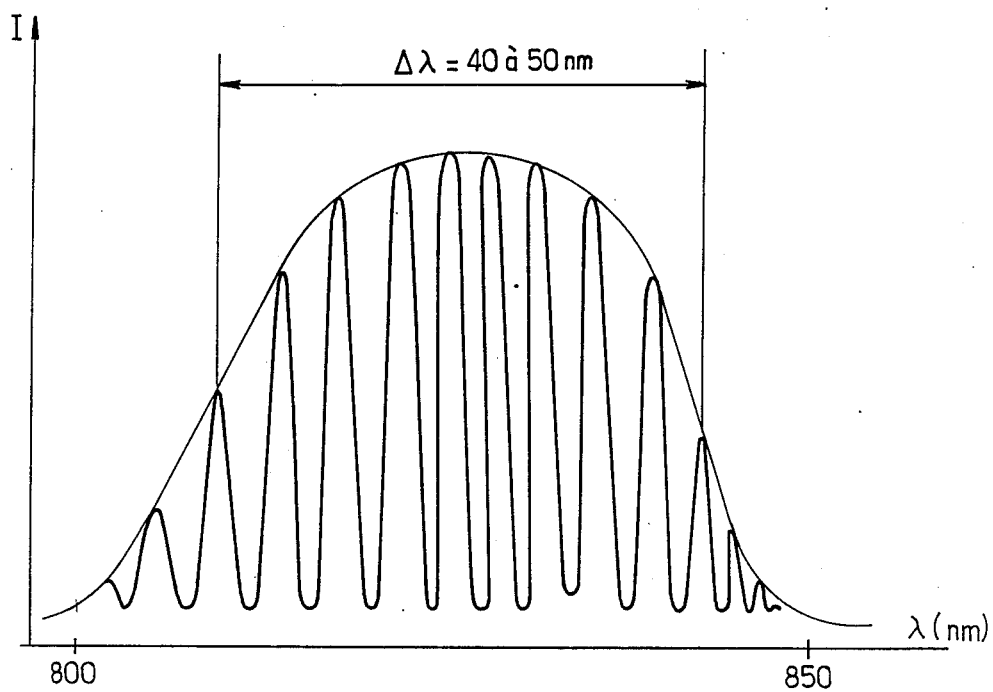
Figure 3:
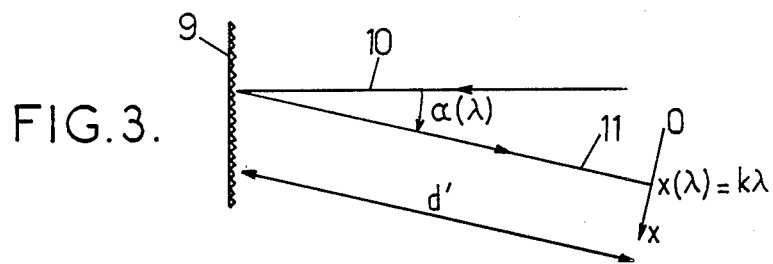
Figure 4:
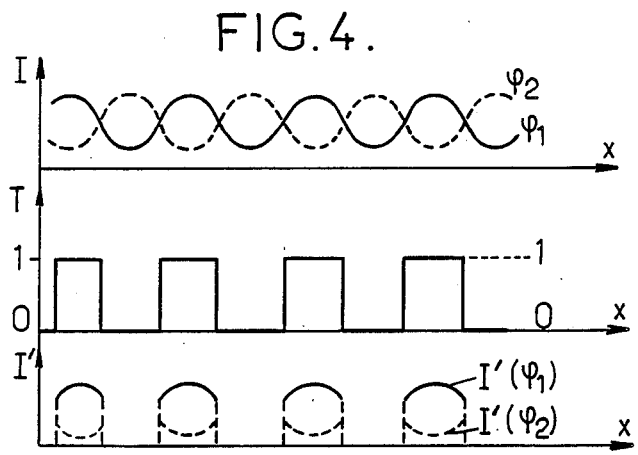
Figure 5:
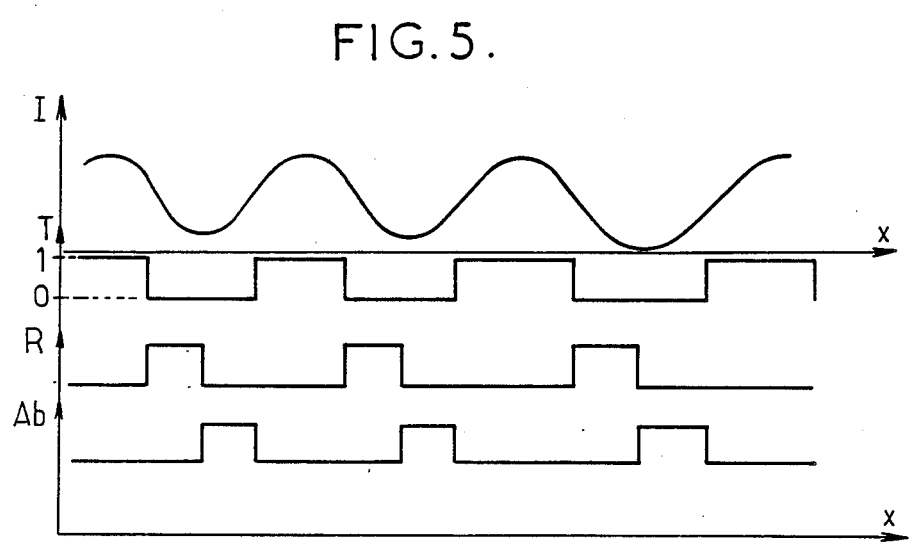
Figure 6:
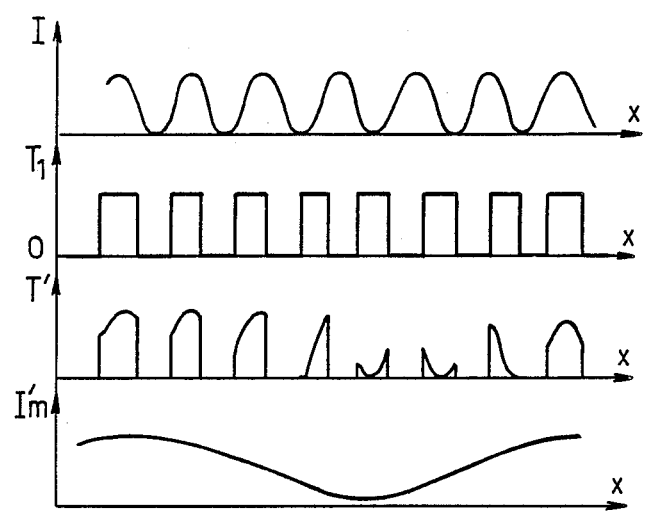
Figure 7:
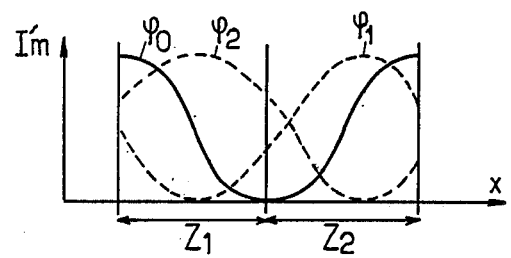
Figure 8:
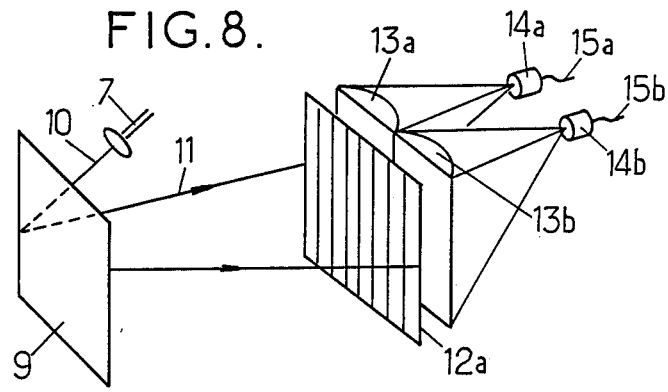
Figure 9:
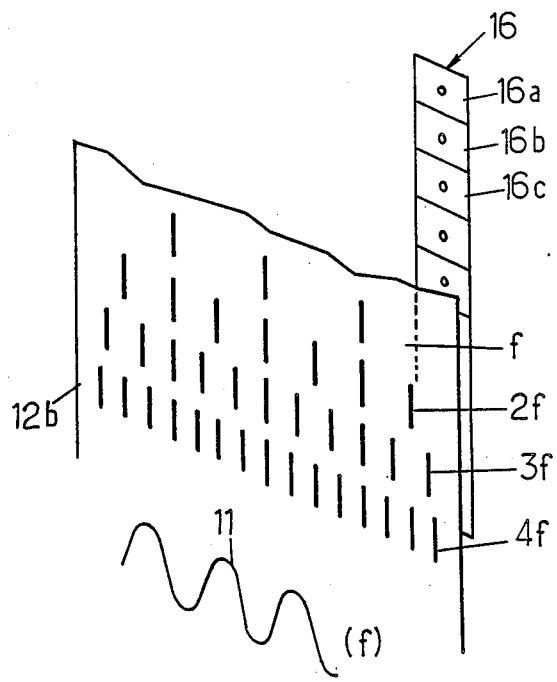
Figure 10:
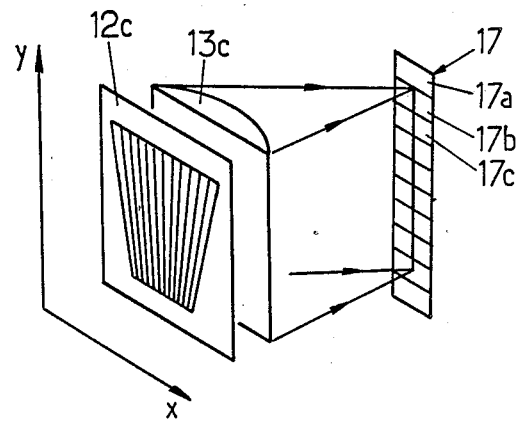
Figure 11:
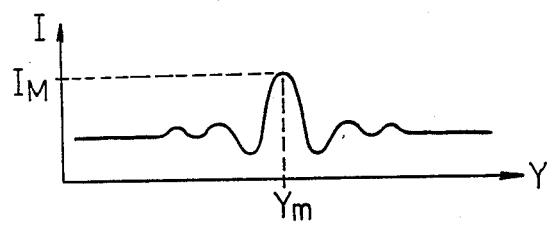
Figure 12:
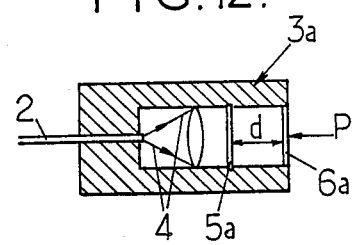

FIG. 1 is a schematic view illustrating one embodiment of a device of the invention, implementing the method of the invention, FIG. 2 shows a part of a channelled spectrum obtained at the output of the interferometer of the device of FIG. 1, FIG. 3 is an explanatory diagram showing the spatial spread of the channelled spectrum obtained at the output of the interferometer of the device of FIG. 1, by means of the diffraction network of the device, FIG. 4 illustrates with top and bottom curves:

the spatial distribution of the intensity of the light produced by the network of FIG. 3, the transmission coefficient of the filter forming part of the device of FIG. 1, The intensity transmitted by the filter from said spatial distribution, FIG. 5 shows, with successive top and bottom curves:

the spatial distribution of the intensity at the input of the filter, the transmission of another type of filter, the reflection produced by this filter, the absorption produced by this filter, FIG. 6 is similar to FIG. 4 but in the case where the period of the filter is slightly different from that of the spatially spread incident light beam and illustrates from top to bottom the spatial variations of the incident intensity, of the transmission coefficient of the filter, of the light intensity transmitted by the filter and finally the mean light intensity transmitted by the filter, FIG. 7 illustrates the variations of the phase of the mean intensity transmitted by the same filter, FIG. 8 shows a variant of the analyzer of FIG. 1, using a filter which corresponds to FIGS. 6 and 7, FIG. 9 illustrates partially a second variant of the analyzer of FIG. 1, FIG. 10 illustrates a third variant of the analyzer of FIG. 1, FIG. 11 shows the output of the filter of the analyzer of FIG. 10, FIG. 12 shows partially a variant of the interferometer of FIG. 1 for measuring a pressure variation.

According to the invention, desiring to realize a measuring method and device employing analysis of a channelled light spectrum, particularly for measuring a low amplitude movement of a mobile surface, possibly representative of the variation of a physical magnitude convertible into such a movement, the following or similar is the way to set about it.

Referring first of all to FIG. 1, the creation will first of all be explained of a channelled spectrum depending on the relative position of two reflecting surfaces, one fixed and the other mobile, of a double beam interferometer, such as a Fizeau interferometer.

The light emitted by a white light source or more generally by a light source having an extended spectral width, such as a tungsten filament lamp or a light emitting diode (LED) is transmitted by an optical fiber 2, of multimode type, to a Fizeau interferometer 3 which receives the incident light beam 4 coming from the optical fiber 2.

Such an interferometer comprises two reflecting surfaces 5 and 6, surface 5 being fixed whereas surface 6 is mobile and it is the movement of this mobile surface 6 with respect to the fixed surface 5 which is to be measured: the position of surface 6 may depend on a physical magnitude, such as a pressure, temperature. magnetic field, electric field) whose variations are convertible into position variations and so into movements of the mobile surface 6.

In FIG. 2, a channelled spectrum is illustrated obtained at the output of the Fizeau interferometer 3, the intensity I being plotted as ordinates and the wavelength (in nanometers) as abscissa, the wavelength range being of the order of 40 to 50 nm.

If we designate by d the distance (variable) between surfaces 5 and 6 and by $\theta$ the angle of incidence considered, the difference of rate of progress for the rays 4 reflected from surface 6 (reflected rays 4a) and reflected from surface 5 (reflected rays 4b), designated e, is given by the formula $e = nd/\cos\theta$, in which n represents the refraction index of air. The two emergent beams 4a, 4b have followed optical paths of different lengths, the optical path difference being equal to e, which can be translated, in phase terms, by the formula $\Delta\phi = 4\phi e/\lambda$ in which $\lambda$ designates the wavelength and $\Delta\phi$ the phase variation between the beams 4a and 4b.

Thus it can be seen that the white light undergoes a sinusoid modulation of intensity I as a function of the wavelength $\lambda$, which may be written $I(\lambda) = I_0(A + \cos 4\pi e/\lambda)$ in which formula $I_0$ represents the mean intensity and A represents the contrast of the interferometer. A is greater than or equal to 1. In practice, and this is what will be done hereafter, A will be taken equal to 1.

If the spectral width is small relative to the central wavelength $\lambda_O$, it can be linearized to the first order and we can write $I(\lambda) = I_0(\cos 4\pi e/\lambda_O(2 - \lambda/\lambda_O) + 1)$, namely $I(\lambda) = I_0(\cos(\phi - 2\pi\lambda/\Lambda) + 1)$, in which formula $\Lambda = \lambda_O^2/2e$ is the modulation period of the spectrum of the light coming from the interferometer and is $\phi = 8\pi e/\lambda_O$ is independent of $\lambda$.

It can then be seen that by analyzing the modulation of the channelled spectrum of the light from the interferometer 3, the optical wavelength e of the interferometer 3 can be determined from the phase $\phi$ of this channelled spectrum, and consequently the distance d between the mobile surface 6 and the fixed surface 5 of the interferometer, so the movement of this mobile surface 6.

Of course, it is arranged for the maximum movement of the mobile surface to be small with respect to the nominal separation $d_O$ between the two fixed and mobile surfaces (e.g. this maximum movement is of the order of $d_O/10$).

It can be seen that a small variation of d and consequently of e results in a proportional modification of the phase $\phi$ of the sinusoid, as well as the modulation period of the spectrum.

If the variation of d and so of e is small and if the useful spectral range is narrow, the variation of may be neglected and only the variation of $\phi$ taken into consideration.

For this, in accordance with the invention, at the output of an optical fiber 7, preferably of multimode type which transmits the beams 4a and 4b leaving the Fizeau interferometer 3, an analyzer 8 is provided which comprises a dispersive element such as a prism or a network, a filter and photodetectors.

In FIG. 1 a dispersive network 9 has been shown which is also shown in FIG. 3 in which the double beam 10 has also been shown which leaves the optical fiber 7 and which is incident with respect to network 9.

In network 9, to each wavelength of the double incident beam, there corresponds a deflection direction 11, as illustrated by the angle $\theta$ ($\lambda$), namely at a distance d' network 9, a coordinate x($\lambda$) proportional to $\lambda$ on an axis ox perpendicular to the optical axis of the network 9, x($\lambda$)=k $\lambda$ with k representing a constant.

It can therefore be seen that the spectral moduation of the intensity produced by the interferometer 3 results at the output of network 9 in a spatial modulation (spatial spread) of the form $$I(x)=I_O(\cos(\phi+2\pi x/k\Lambda)+1).$$

The analyzer 8 comprises means for filtering this spatial distribution, in particular a filter 12 whose transmission coefficient T varies periodically between 0 and 1, with a fixed period which is the same as said spatial modulation period.

In FIG. 1, at the upper part, the variation of the light intensity I has been shown as a function of the distance x, of the spatial modulation for two different phases namely a phase $\phi_1$ (continuous line curve) and a phase $\phi_2$ (broken line curve). Below has been shown, also as a function of x, the variation of the transmission coefficient T of filter 12 between 0 and 1. Finally, at the lower part, the variation has been illustrated of the intensity I' transmitted by filter 12, also as a function of x, and it can be seen that this intensity I' depends on the phase: with a continuous line has been shown the intensity transmitted corresponding to the phase shift $\phi_1$ and with broken lines the intensity transmitted for the phase shift $\phi_2$ the spatial modulation produced by network 9.

With the lens 13-photodetector 14 assembly of FIG. 1, the total intensity can be measured which is transmitted by filter 12, which total intensity (available at 15) depends on the phase $\phi$ of the spatial modulation produced by network 9 and so on the spatial modulation produced by interferometer 3 and finally on the distance d which it is desired to measure.

Determining alone the intensity transmitted by means of lens 13 and photodetector 14 has the disadvantage that the output signal of the photodetector 14 is sensitive not only to the variations of phase but also to those of the mean intensity $I_O$ of the light.

This is why filter 12 is advantageously formed of two complementary filters formed by a succession of completely reflecting zones 12r and completely transparent zones 12t, one of the filters being a transmission filter and the other a reflection filter, and a second lens 13' and a second photodetector 14' are provided which receive the total light reflected by the filter, which also depends on the phase $\phi$ and on the mean intensity $I_O$ and which is available at 15'.

The sum of the intensities received by the two detectors 14 and 14' is a direct function of $I_O$ and it is then sufficient to determine the ratio between the output 15 or 15' of one of the two photodetectors 14 or 14' and the sum of the outputs of both photodetectors so as to have a signal independent of $I_O$ (which appears as the numerator and the denominator of this ratio), which signal depends solely on $\phi$ so on e and finally on d which it is desired to measure. A very simple electronic unit 20 determines such a ratio, its output 21 depending solely on $\phi$ so on d.

It will be noted that with the device of FIG. 1 comprising two complementary filters, the phase can be measured for variations between 1 and $\pi$ only.

Filter 12 may be improved for measuring the phase for variations between 0 and $2\pi$, by providing, in the zones with a transmission coefficient different from 1, a succession of absorbing zones and reflecting zones. The results obtained with such a modified filter follow from the curves of FIG. 5.

At the upper part of this FIG. 5, we find again the sinusoid illustrating the variations of intensity I as a function of the distance x, at the input of the modified filter 12. The following three lines represent the transmission T, reflection R and absorption Ab coefficients respectively of the successive bands of the modified filter 12.

The result is that the output signal from photodetector 14 which measures the transmitted intensity is in quadrature with the output signal of photodetector 14' which represents the signal reflected by the filter. This quadrature phase shift between the two signals makes it possible to completely eliminate the lack of determination over $2\pi$ radians (360°) and so to know the direction of variation of $\phi$. In a first variant, instead of a filter 12 whose spatial period is exactly that of the spatial modulation period of the double beam 11 arriving at the filter, a filter 12a can be used (FIG. 8) having a spatial period slightly different from that of the incident beam 11. In this case, the light transmitted by the filter contains a periodic term as a function of the distance x, the frequency of which term (beat frequency) is equal to the difference of the frequencies of filter 12a and the incident beam 11.

As can be seen in FIG. 6, for an incident beam 11 of the type illustrated at the top of this figure and a transmission coefficient T varying between 0 and 1 of filter 12a, shown in the second line of this FIG., a transmitted intensity I' is obtained illustrated in the third line of this figure and a mean transmitted intensity I'm illustrated in the last line of this FIG. 6.

Assuming that the modulation frequency of the double beam, on the one hand, and the filter 12a on the other are respectively A and A' and that the filter has a transmission coefficient T which is a sinusoidal function of x given by the formula $$T(x)=[\cos(2\pi A'x)+1]/2$$

the transmitted intensity will have the value
$I=I_O/2[1+\cos(\phi+2\pi Ax)] [1+(\cos 2\pi A'x)],$ which formula may be broken down as follows $$I = I_0/2 [1 + \tfrac{1}{2}\cos(\phi + 2\pi(A-A')x) + \tfrac{1}{2}\cos(\phi + 2\pi(A+A')x) + \cos(\phi + 2\pi Ax) + \cos(2\pi A'x)].$$

Since the three last terms of this formula have a zero mean on the scale of the period (1/A), the intensity is then proportional to $$1 + \tfrac{1}{2}\cos(\phi + 2\pi Bx) \qquad (1)$$

by calling B the difference $A - A'$, which is the beat frequency.

If we choose L, the total analysis length over x, and the frequency $A'$ of the filter, and so the beat frequency B, so that we have $L = 1/B$, the local mean of the transmitted intensity extends exactly over a period of the beat frequency B, as is illustrated by the curves in FIG. 7 corresponding to three frequencies $\phi_1$, $\phi_1$, $\phi_2$.

The formula (1) shows that by measuring the total transmitted intensity in each of the halves of the field, namely in zones $Z_1$ and $Z_2$ of FIG. 7, signals are obtained proportional to $1 + \cos\phi$ for field $Z_1$ and to $1 - \cos\phi$ for field $Z_2$. $\phi$ can be readily derived therefrom in the zone from 0 to $\pi$.

If, on the other hand, $L = \tfrac{1}{2}B$ is chosen, $\sin\phi$ and $\cos\phi$ are obtained which make it possible to determine over the interval 0 to 2 without a lack of determination and even short of that and beyond by counting the fringes. However, in this case, it is necessary to eliminate $I_O$ so as to have an absolute determination and $\cos^2 + \sin^2$ must be calculated for standardizing.

In FIG. 8 the variant of the analyzer 8 has been shown comprising, in addition to network 9, a filter 12a of the above type and two lenses 13a and 13b cooperating with photodetectors 14a and 4b respectively whose outputs at 15a and 15b are proportional to:

$1 + \cos\phi$ and $1 - \cos\phi$ when $L = /B$ $\sin\phi$ and $\cos\phi$ when $L = \tfrac{1}{2}B$ In FIG. 9, a second variant has been illustrated in which the filter is a Moiré filter 12b with several frames, for example four frames at frequencies f, 2f, 3f and 4f, behind which is provided an array 16 of photodiodes 16a, 16b, 16c...

In front of the multi-frame Moiré filter the incident light 1 has been illustrated of spatial frequency f.

A third variant is illustrated in FIG. 10, this variant comprising a filter 12c whose period varies linearly in a direction y perpendicular to x, this filter 12c being followed by a cylindrical lens 13c which concentrates the light rays leaving filter 12c on an array 17 of photodiodes 17a, 17b, 17c... oriented in direction y. Such an arrangement, illustrated in FIG. 10, makes it possible to measure the value of e, so of d, when the period varies greatly in the variation band of e.

With such a filter, the intensity in direction y is given by the formula $$I = I_1[1 + \sin(k'(Y + Y_m)/(Y + Y_m)]$$

in which k' is a parameter which is proportional to the spectral width of the source and $Y_m$ is the value of the abscissa Y for which the frequency of the filter is equal to the modulation frequency of the source.

The latter formula is illustrated by the curve of FIG. 11 in which Y is shown as abscissa and the intensity I as ordinates and in which the value $Y_m$ has been shown. Detection of the intensity maximum $I_M$ makes it possible to know the abscissa $Y_m$ and so the spectral modulation period of the source, which allows the value of e, so of d, to be derived.

It can then be seen that, with the invention, e can be measured, the distance between a fixed surface 5 and a mobile surface 6 whose movement it is desired to detect, without using complicated digital computation methods for analyzing the channelled spectrum (that of FIG. 2) resulting from the spectral dispersion of the light beam passing through the interferometer 3.

According to the invention, it is sufficient to use a dispersive network, a filter (and different types of filters have been illustrated), possibly one or two lenses (in the case of certain filters) and photodetectors or an array of photodiodes.

The position of the mobile surface 6 whose movements are measured, which are a function of d, may represent a physical magnitude (pressure, temperature, electric field, magnetic field, etc.).

In particular, in FIG. 12, it has been illustrated how to convert a pressure P into a movement in a modified Fizeau interferometer 3a; a glass plate 5a forms the fixed surface and a deformable membrane 6a which is subjected to the pressure P forms the mobile surface of the interferometer 3.

The pressure to be measured P, applied to the right hand side of membrane 6a, deforms the latter while varying the distance d between its rear reflecting face and the glass plate 5a also reflecting. The stiffness of the deformable membrane is chosen so that it undergoes its maximum movement for the maximum value of the range of pressures it is desired to measure, the nominal spacing between the membrane at rest and the glass plate being chosen so that it is large with respect to the maximum movement of the membrane.

In FIG. 12, the glass fiber 2 and the incident light beam 4 are shown.

As is evident and as it follows moreover from the foregoing, the invention is in no wise limited to those of its modes of application and embodiments which have been more especially considered, it embraces, on the contrary, all variants thereof.

We claim:

1. In a channelled light spectrum analysis measurement method, particularly for measuring a low amplitude movement of a mobile surface representative of the variation of a physical magnitude convertible into such a movement, comprising generating a channelled spectrum the spectral modulation frequency of which is a function of the movement of a mobile surface with respect to a reference position thereof, and analyzing the channelled spectrum, the improvement comprising analyzing said channelled spectrum by spatially spreading the frequency-modulated channelled spectrum, filtering the spatially-spread spectrum with a filtering coefficient which varies periodically with a fixed period, which is substantially equal to the spatial period of the spatially-spread spectrum, for a reference position of said mobile surface, and deriving from the filtered spectrum a modulation phase of the channelled spectrum.

2. Method according to claim 1, wherein the channelled spectrum is analyzed by further deriving a mean intensity of the channelled spectrum from the filtered spectrum.

3. In a channelled light spectrum analysis measurement method, particularly for measuring a low amplitude movement of a mobile surface representative of the variation of a physical magnitude convertible into such a movement, comprising generating a channelled spectrum, the spectral modulation frequency of which is a function of the movement of a mobile surface with respect to a reference position thereof, and analysing the channelled spectrum, the improvement comprising analysing said channelled spectrum by spatially spreading the frequency-modulated channelled spectrum, filtering the spatially-spread spectrum with a filtering coefficient which varies periodically with a fixed period, which is substantially proportional to the spatial period of the spatially-spread spectrum, for a reference position of said mobile surface, and deriving from the filtered spectrum a modulation phase of the channelled spectrum.

4. In a device for measuring a channelled light spectrum, particularly for measuring a small amplitude movement of a mobile surface, comprising a two-beam interferometer having a first and a second reflecting surface, said first reflecting surface being stationary and said second reflecting surface being mobile and constituting said mobile surface, said first and second surface defining therebetween a variable interval corresponding to a difference in the rate of progress of the light rays in said interferometer; a light source illuminating said interferometer; and an analyzer for analyzing the channelled spectrum generated by said light source in said interferometer, the improvement comprising said analyzer including means for spatially spreading a frequency-modulated channelled spectrum, a filter having a transmission and reflection coefficient which is periodic at least in one direction with a period substantially equal to a period of a spatial distribution of the spatially-spread spectrum, for obtaining a reference position of said mobile surface, said filter receiving from said interferometer said spatially-spread spectrum, and at least one photodetector receiving an outgoing light from said filter for determining a modulation phase of said channelled spectrum and said difference in the rate of progress which is a function of the movement of said second surface.

5. The device according to claim 4, and further comprising at least two photodetectors having outputs and means for deriving a modulation phase and a mean intensity of said channelled spectrum from said outputs of said photodetectors.

6. The device according to claim 4 wherein said interferometer is constituted by a Fizeau interferometer.

7. The device according to claim 4, wherein said spatially spreading means are constituted by a diffraction network.

8. The device according to claim 4, wherein said light source is constituted by a white light source.

9. The device according to claim 4, wherein said light source is constituted by a light-emitting diode.

10. The device according to claim 4, and further comprising optical fibers positioned between said light source and an input of said interferometer and between an output of said interferometer and said analyzer.

11. The device according to claim 8, wherein said light source is constituted by a tungsten filament lamp.

12. The device according to claim 10, wherein said optical fibers are constituted by multimode optical fibers.

13. In a device for measuring a channelled light spectrum, particularly for measuring a small amplitude movement of a mobile surface, comprising a two-beam interferometer having a first and a second reflecting surface, said first reflecting surface being stationary and said second reflecting surface being mobile and constituting said mobile surface, said first and second surface defining therebetween a variable interval corresponding to a difference in the rate of progress of the light rays in said interferometer; a light source illuminating said interferometer, and an analyzer for analyzing the channelled spectrum generated by said light source in said interferometer, the improvement comprising said analyzer including means for spatially spreading a frequency-modulated channelled spectrum, a filter having a transmission and reflection coefficient which is periodic at least in one direction with a period substantially proportional to a period of a spatial distribution of the spatially-spread spectrum, for obtaining a reference position of said mobile surface, said filter receiving from said interferometer said spatially-spread spectrum, and at least one photodetector receiving an outgoing light from said filter for determining a modulation phase of said channelled spectrum and said difference in the rate of progress which is a function of the movement of said second surface.

* * * * *